United States Patent
Wei et al.

(10) Patent No.: US 9,313,037 B2
(45) Date of Patent: Apr. 12, 2016

(54) METHOD, APPARATUS AND SYSTEM FOR FORWARDING DATA UNDER PROTOCOL INDEPENDENT MULTICAST DUAL JOIN

(71) Applicant: Huawei Technologies Co., Ltd., Shenzhen, Guangdong (CN)

(72) Inventors: Yong Wei, Shenzhen (CN); Yisong Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 419 days.

(21) Appl. No.: 13/674,689

(22) Filed: Nov. 12, 2012

(65) Prior Publication Data

US 2013/0064245 A1    Mar. 14, 2013

Related U.S. Application Data

(63) Continuation of application No. PCT/CN2010/080556, filed on Dec. 31, 2010.

(30) Foreign Application Priority Data

May 11, 2010  (CN) .......................... 2010 1 0168544

(51) Int. Cl.
*H04L 12/18* (2006.01)
*H04L 12/761* (2013.01)
(Continued)

(52) U.S. Cl.
CPC .............. *H04L 12/18* (2013.01); *H04L 12/185* (2013.01); *H04L 45/16* (2013.01); *H04L 45/22* (2013.01); *H04L 45/28* (2013.01)

(58) Field of Classification Search
CPC ....... H04L 12/185; H04L 12/18; H04L 45/16; H04L 49/201
See application file for complete search history.

(56) References Cited

U.S. PATENT DOCUMENTS 7,808,993 B2 * 10/2010 Zwiebel et al. ................ 370/392
8,526,300 B2 *  9/2013 Arberg et al. ................. 370/225
(Continued)

FOREIGN PATENT DOCUMENTS

CN       101102274 A     1/2008
CN       101442485 A     5/2009
(Continued)

OTHER PUBLICATIONS

Written Opnion of the International Searching Authority dated Apr. 7, 2011 in connection with International Patent Application No. PCT/CN2010/080556.
(Continued)

*Primary Examiner* — Robert C Scheibel
*Assistant Examiner* — Prenell Jones

(57) ABSTRACT

Embodiments of the present invention relates to the field of communications, which complements a data forwarding method of a backup incoming interface under protocol independent multicast dual join in a PIM protocol, facilitates implementation of compatibility in various manufacturers, and reduces a restriction of a network topology on the application of the PIM protocol. The method includes: when a main incoming interface is up, forwarding, by a router, multicast data received from a backup incoming interface to the main incoming interface in a join state; and when the main incoming interface is down, before selecting a new main incoming interface and/or backup incoming interface, forwarding, by the router, the multicast data received from the backup incoming interface to all interfaces in a join state or to all other interfaces in a join state except the backup incoming interface.

14 Claims, 3 Drawing Sheets

When a main incoming interface is up, a router forwards multicast data received from a backup incoming interface to the main incoming interface in a join state — S101

When the main incoming interface is down, before selecting a new main incoming interface and/or backup incoming interface, the router forwards the multicast data received from the backup incoming interface to all interfaces in a join state or to all other interfaces in a join state except the backup incoming interface — S102

(51) Int. Cl.
*H04L 12/707* (2013.01)
*H04L 12/703* (2013.01)

(56) References Cited

U.S. PATENT DOCUMENTS

| | | | | |
|---|---|---|---|---|
| 2002/0071430 A1* | 6/2002 | Szyszko | ....... | 370/389 |
| 2007/0192451 A1* | 8/2007 | Tran et al. | ....... | 709/223 |
| 2007/0253416 A1* | 11/2007 | Raj | ....... | 370/390 |
| 2008/0101360 A1* | 5/2008 | Napierala | ....... | 370/390 |
| 2008/0267078 A1 | 10/2008 | Farinacci et al. | | |
| 2009/0201803 A1* | 8/2009 | Filsfils et al. | ....... | 370/222 |
| 2009/0245248 A1* | 10/2009 | Arberg et al. | ....... | 370/390 |
| 2010/0165988 A1* | 7/2010 | Soccol et al. | ....... | 370/390 |
| 2011/0085548 A1* | 4/2011 | Fernandez Gutierrez | .... | 370/390 |
| 2012/0099422 A1 | 4/2012 | Liu et al. | | |
| 2013/0235717 A1* | 9/2013 | Ramakrishnan et al. | ..... | 370/225 |

FOREIGN PATENT DOCUMENTS

| | | |
|---|---|---|
| CN | 101442485 A | 5/2009 |
| CN | 101656679 A | 2/2010 |
| WO | WO 2006/017982 A1 | 2/2006 |

OTHER PUBLICATIONS

B. Fenner, et al., "Protocol Independent Multicast—Sparse Mode (PIM-SM): Protocol Specification (Revised)", Network Working Group, Aug. 2006, 112 pages.

Communication dated Feb. 13, 2013 in connection with European Patent Application No. 10 851 317.7.

A. Karan et al., "Multicast -only Fast Re-Route", Network Working Group, Mar. 2, 2009, 13 pages.

Rajiv Chaudhuri, et al., "End to End IPTV Design and Implementation, How to avoid Pitfalls", Ericsson, Telecommunication Network Strategy and Planning Symposium, Sep. 28, 2008, 119 pages.

International Search Report dated Apr. 7, 2011 in connection with International Patent Application No. PCT/CN2010/080556.

Partial translation of Office Action dated May 30, 2013 in connection with Chinese Patent Application No. 201010168544.0.

\* cited by examiner

When a main incoming interface is up, a router forwards multicast data received from a backup incoming interface to the main incoming interface in a join state — S101

When the main incoming interface is down, before selecting a new main incoming interface and/or backup incoming interface, the router forwards the multicast data received from the backup incoming interface to all interfaces in a join state or to all other interfaces in a join state except the backup incoming interface — S102

FIG. 1

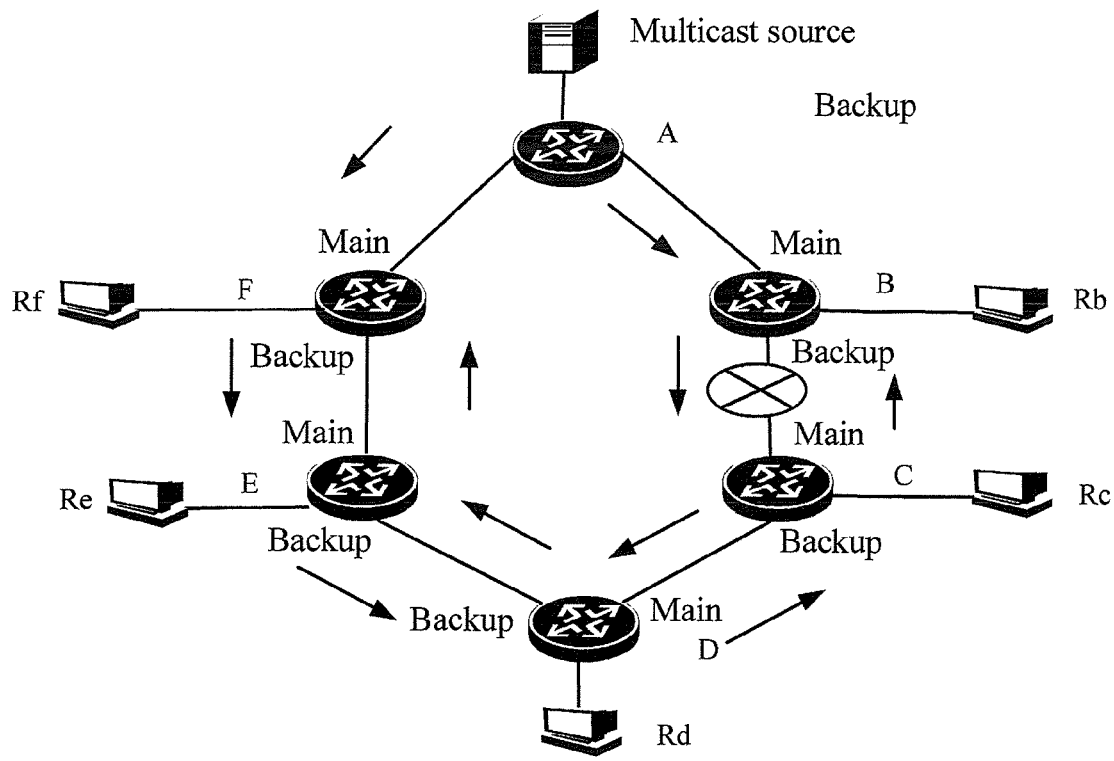

FIG. 2

METHOD, APPARATUS AND SYSTEM FOR FORWARDING DATA UNDER PROTOCOL INDEPENDENT MULTICAST DUAL JOIN

CROSS-REFERENCE TO RELATED APPLICATIONS

This application is a continuation of International Application No. PCT/CN2010/080556, filed on Dec. 31, 2010, which claims priority to Chinese Patent Application No. 201010168544.0, filed on May 11, 2010, both of which are hereby incorporated by reference in their entireties.

TECHNICAL FIELD

The present invention relates to the field of communications, and in particular, to a method, a router and a network system for forwarding data under protocol independent multicast dual join.

BACKGROUND

IP multicast refers to sending of a data package with best effort (Best Effort) in an IP network to a certain determined node subset in the network. This subset is referred to as a multicast group (Multicast Group). A basic concept of the IP multicast is that a source host sends only one copy of data, where a destination address in the copy of data is an address of the multicast group and all receivers in the multicast group can receive the same copy of data.

A multicast flow is forwarded along an established multicast forwarding route. A router on the forwarding route may need to forward a message received from one incoming interface to multiple outgoing interfaces in order to transmit a multicast message to a receiving station at each position. A PIM (Protocol Independent Multicast, protocol independent multicast) protocol is a most widely used protocol among protocols for establishing a multicast forwarding route.

A current network service imposes an increasingly higher requirement on a real-time characteristic. When a link fails, a multicast service also needs to reduce a lost multicast data message. The PIM Dual Join (PIM dual join) technology is used to solve a problem that a multicast service is able to converge rapidly when a link fails on a multicast forwarding route. In a PIM Dual Join solution, two forwarding routes for forwarding multicast data are established by applying the same copy of multicast data stream from two directions. When one of links fails, multicast data may be received selectively from a backup multicast forwarding tree.

In an existing multicast PIM protocol, an RPF (Reverse Path Forwarding, reverse path forwarding) rule is a basic rule of multicast, which considers that a multicast entry has merely one upstream, namely, an outgoing interface and a next hop of an optimal unicast routing to a multicast source or a reverse path. The outgoing interface is an RPF interface in the PIM protocol and the next hop is an RPF neighbor in the PIM protocol.

As regards this, the inventor finds that after the PIM Dual Join solution is proposed, a scenario that is not defined in an existing PIM protocol is added. Namely, a PIM protocol entry has two incoming interfaces, which are respectively referred to as a main incoming interface and a backup incoming interface. A behavior of the main incoming interface has been defined in detail in an existing protocol, but the backup incoming interface has a unique peculiarity. The backup incoming interface not only has a property of an incoming interface, but also may exist as an outgoing interface at the same time. Forwarding and protocol behaviors of the backup incoming interface are not defined at present. In this way, compatibility in various manufacturers is not easily implemented, and a restriction of a network topology on the application of the PIM protocol is increased.

SUMMARY

Embodiments of the present invention provide a method, a router and a network system for forwarding data under protocol independent multicast dual join, which complement a data forwarding method of a backup incoming interface under protocol independent multicast dual join in a PIM protocol, facilitate implementation of compatibility in various manufacturers, and reduce a restriction of a network topology on the application of the PIM protocol.

In order to achieve the preceding objectives, the embodiments of the present invention adopt the following technical solutions.

A method for forwarding data under protocol independent multicast dual join is provided, where under the protocol independent multicast dual join, a router includes a main incoming interface and a backup incoming interface, and the method includes:

when the main incoming interface is up, forwarding, by the router, multicast data received from the backup incoming interface to the main incoming interface in a join state; and when the main incoming interface is down, before selecting a new main incoming interface and/or backup incoming interface, forwarding, by the router, the multicast data received from the backup incoming interface to all interfaces in a join state or to all other interfaces in a join state except the backup incoming interface.

A router, configured to forward data under protocol independent multicast dual join, includes a main incoming interface and a backup incoming interface.

When the main incoming interface is up, the router forwards multicast data received from the backup incoming interface to the main incoming interface in a join state.

When the main incoming interface is down, before selecting a new main incoming interface and/or backup incoming interface, the router forwards the multicast data received from the backup incoming interface to all interfaces in a join state or to all other interfaces in a join state except the backup incoming interface.

A network system, configured to forward data under protocol independent multicast dual join, is formed by connecting multiple routers, and each router includes a main incoming interface and a backup incoming interface.

The backup incoming interface is configured to, when the main incoming interface is up, the router forwards multicast data received from the backup incoming interface to the main incoming interface in a join state; and when the main incoming interface is down, before selecting a new main incoming interface and/or backup incoming interface, the router forwards the multicast data received from the backup incoming interface to all interfaces in a join state or to all other interfaces in a join state except the backup incoming interface.

The main incoming interface is configured to, when the main incoming interface is up, the router forwards multicast data received from the main incoming interface to all interfaces in a join state except the main incoming interface of the router.

With the method, the router and the network system for forwarding data under protocol independent multicast dual join that are provided in the embodiments of the present invention, the data forwarding method of the backup incoming interface under protocol independent multicast dual join in the PIM protocol is complemented, a blank is filled, thereby facilitating the implementation of the compatibility in various manufacturers, and reducing the restriction of the network topology on the application of the PIM protocol.

BRIEF DESCRIPTION OF THE DRAWINGS

FIG. 1 is a block diagram of a method for forwarding data under protocol independent multicast dual join according to an embodiment of the present invention;

FIG. 2 is a first schematic structural diagram of a network used in an embodiment of the present invention;

DETAILED DESCRIPTION

Figure 3:
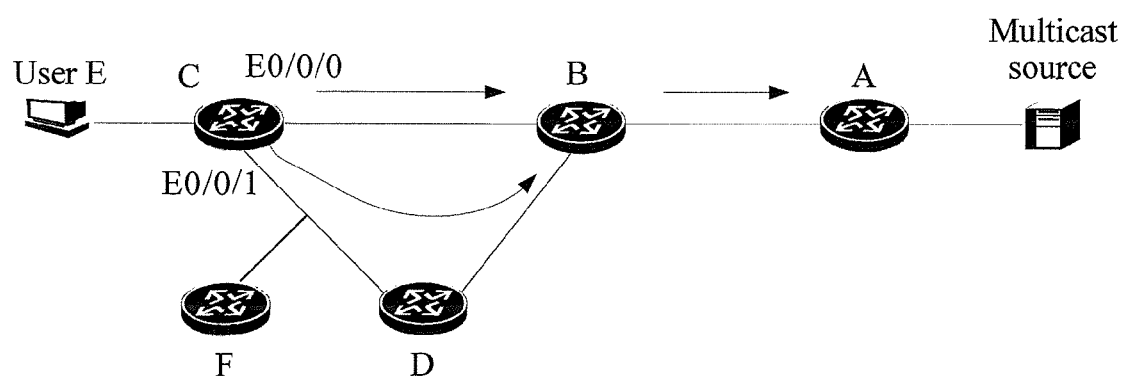
FIG. 3 is a second schematic structural diagram of a network used in an embodiment of the present invention.

The technical solutions in the embodiments of the present invention are clearly and completely described in the following with reference to the accompanying drawings in the embodiments of the present invention. It is obvious that the embodiments to be described are only a part rather than all of the embodiments of the present invention. Based on the embodiments of the present invention, all other embodiments obtained by persons of ordinary skill in the art without creative efforts shall fall within the protection scope of the present invention.

An embodiment of the present invention provides a method for forwarding data under protocol independent multicast dual join, where under the protocol independent multicast dual join, a router includes a main incoming interface and a backup incoming interface. As shown in FIG. 1, steps of the method include:

S101: When the main incoming interface is up, the router forwards multicast data received from the backup incoming interface to the main incoming interface in a join state.

S102: When the main incoming interface is down, before selecting a new main incoming interface and/or backup incoming interface, the router forwards the multicast data received from the backup incoming interface to all interfaces in a join state or to all other interfaces in a join state except the backup incoming interface.

With the method for forwarding data under protocol independent multicast dual join provided in this embodiment of the present invention, a data forwarding method of a backup incoming interface under protocol independent multicast dual join in a PIM protocol is complemented, a blank is filled, thereby facilitating implementation of compatibility in various manufacturers, and reducing a restriction of a network topology on the application of the PIM protocol.

A method for forwarding data under protocol independent multicast dual join is provided in another embodiment of the present invention, which is described by taking a ring network topology that is widely used in a network as an example. As shown in FIG. 2, a router A is connected to a multicast source and routers B, C, D, E, and F are connected to users Rb, Rc, Rd, Re and Rf respectively. All interfaces of routers in the network enable a PIM-SM (Protocol Independent Multicast-Sparse Mode, protocol independent multicast-sparse mode) or a PIM-SSM (Protocol Independent Multicast-Source-Specific Multicast, protocol independent multicast-source-specific multicast). An interface that is connected to a user enables an IGMP (Internet Group Management Protocol, internet group management protocol).

When receiving a user (S,G) join, each of the routers B, C, D, E, and F that are connected to the users sends a data stream of a pim (S,G) join for applying for the multicast source to two sides.

For example, the router B sends the pim (S,G) join to the routers A and C, and the router C sends the pim (S,G) join to the router B and the router D. Deducted by analogy, (S,G) entries on devices of the routers B, C, D, E, and F all have two incoming interfaces: a main incoming interface and a backup incoming interface, where:

a main incoming interface of the router B is towards the router A, and a backup incoming interface is towards the router C;

a main incoming interface of the router C is towards the router B, and a backup incoming interface is towards the router D;

a main incoming interface of the router D is towards the router C, and a backup incoming interface is towards the router E;

a main incoming interface of the router E is towards the router F, and a backup incoming interface is towards the router D; and a main incoming interface of the router F is towards the router A, and a backup incoming interface is towards the router E.

In an initial case, two ring flows with the multicast source as a root are formed, namely, A→B→C→D→E→F and A→F→E→D→C→B.

At this time, a forwarding method provided in an embodiment of the present invention may be used for forwarding (S,G) flows on the devices of the routers B, C, D, E, and F. The router C is taken as an example, which is specifically as follows.

a) When the main incoming interface of the router C is up (UP), when receiving a multicast data stream sent by the router B from the main incoming interface, the router C forwards data to all interfaces in a join state except the main incoming interface of the router C. Namely, a multicast stream is forwarded to an interface that is towards the router D and an interface that is connected to the user Rc. For the router C, all the interfaces in the join state are: the interface towards the router D, an interface towards the router B, and the interface that is connected to the user Rc. The main incoming interface of the router C is the interface towards the router B.

b) When the main incoming interface of the router C is up (UP), the router C forwards a multicast data stream received from the backup incoming interface and forwarded by the router D to a main incoming interface in a join state. Namely, a multicast stream is forwarded to the interface towards B. For the router C, the main incoming interface is the interface towards B, and the interface towards B is in a join state.

c) When a link between the router B and the router C fails, for the router B, the backup incoming interface is down (DOWN), which does not affect a user service, and the device merely needs to re-select a backup routing.

d) When a link between the router B and the router C fails, for the router C, the main incoming interface is down (DOWN), before selecting a new main incoming interface, or a main incoming interface and a backup incoming interface for an (S,G) entry of the router, the (S,G) uses a flow sent by the backup incoming interface. A forwarding behavior at this time is that the backup incoming interface forwards received data to all interfaces in a join state including the backup incoming interface. Namely, a multicast flow is forwarded to the interface towards the router D and an interface towards the user Rc. In this way, forwarding data by the backup incoming interface to the user Rc reduces interference caused by a link failure on a user, and forwarding the data to the router D may ensure stability of flows of the routers D, E, and F.

e) After selecting a new main incoming interface or a main incoming interface and a backup incoming interface for the (S,G), and in this embodiment, after selecting a new main incoming interface, the router C performs forwarding according to behaviors in a) and b).

After a failure occurs between B and C, merely two flows exist, namely, A→B and A→F→E→D→C.

Here, in this embodiment, a designated source is taken as an example; at the same time, this embodiment is also applicable to a PIM-SM scenario with a non-designated source. At this time, a user join received by a router is (*,G), and a data stream of a pim (*,G) join for applying for a multicast source is sent in two directions. Other forwarding rules and methods are the same as that in the preceding embodiment, which are not described here again.

With the method for forwarding data under protocol independent multicast dual join provided in this embodiment of the present invention, a data forwarding method of a backup incoming interface under protocol independent multicast dual join in a PIM protocol is complemented, a blank is filled, thereby facilitating implementation of compatibility in various manufacturers, and reducing a restriction of a network topology on the application of the PIM protocol.

A behavior method for a backup incoming interface in a PIM protocol is provided in another embodiment of the present invention, which is described by taking an assert (assert) scenario of a backup incoming interface of a PIM-SM SPT, a PIM-SM RPT, or a PIM-SSM as an example.

As shown in FIG. 3, a router A is connected to a multicast source, a router C is connected to a user E, and a router F is connected to a shared network segment between the router C and a router D.

The user E sends an igmp (*,G) join or an (S,G) join to the router C.

In order to ensure reliability, the router C sends a pim (*,G) join or an (S,G) join to the multicast source along a main route and a back up route. In the figure, an E0/0/0 of the router C is a main incoming interface, and an E0/0/1 is a backup incoming interface.

An upstream router of the router F is the router C. The router F sends a pim (*,G) join or an (S,G) join to the router C.

In this way, both the router C and the router D forward multicast data to the shared network segment between the router C and the router D. Assert (assert) takes place in a network segment where the interface E0/0/1 of the router C is located. At this time, the backup incoming interface E0/0/1 does not participate, in election for an assert winner (assert winner), and does not trigger an assert (assert) message. Namely, when the E0/0/1 of the router C receives the multicast data, an extended CouldAssert (*,G,I) or CouldAssert (S,G,I) protocol state machine concludes that the E0/0/1 does not have an assert qualification, and does not trigger an assert message. When an outgoing interface of the router D receives the multicast data, an assert message is triggered, and an assert state is switched to an assert winner (assert Winner).

The backup incoming interface E0/0/1 of the router C sets an assert (assert) state to be an assert loser (assert loser). The E0/0/1 is deleted from an outgoing interface list of the router C. The router C stops forwarding a flow to the E0/0/1 interface.

The backup incoming interface E0/0/1 of the router C records an elected assert winner (assert winner), and corresponding protocol state machines are an AssertTrackingDesired (S,G,I) and an AssertTrackingDesired (*,G,I).

Based on the preceding, a C-D network segment merely has a flow forwarded by the router D to the router C. The flow is used as a backup flow of the router C, and is forwarded to the router F at the same time.

Furthermore, if the D fails, the assert winner recorded by the backup incoming interface of the C expires, then an assert state of the backup incoming interface of the C is restored to be an initial state, and the E0/0/1 is added to an outgoing interface list of the main incoming interface of the C to continue to forward a flow for the router F.

Correspondingly, an extended state machine is,

---

AssertTrackingDesired(S,G,I) =
    (I in ( ( joins(*,*,RP(G)) (+) joins(*,G)   (−)
  prunes(S,G,rpt) )
              (+)     ( pim_include(*,G)   (−)
     pim_exclude(S,G) )
        (−) lost_assert(*,G)
        (+) joins(S,G) ) )
  OR (local_receiver_include(S,G,I) == TRUE
    AND  (I_am_DR(I)  OR  (AssertWinner(S,G,I)  ==
me)))
    OR  (((RPF_interface(S)   ==   I)   OR
(RPF_BACKUP_interface(S) == I) )
    AND (JoinDesired(S,G) == TRUE))
  OR    ((RPF_interface(RP(G))    ==    I)    AND
(JoinDesired(*,G) == TRUE)
    AND (SPTbit(S,G) == FALSE))
CouldAssert(S,G,I) =
  SPTbit(S,G)==TRUE
  AND  (RPF_interface(S)  !=  I)  AND
(RPF_BACKUP_interface(S) != I)
  AND  (I in ( ( joins(*,*,RP(G))  (+)  joins(*,G)   (−)
prunes(S,G,rpt) )
          (+)   (   pim_include(*,G)        (−)
    pim_exclude(S,G) )
       (−) lost_assert(*,G)
       (+) joins(S,G) (+) pim_include(S,G) ) )
CouldAssert(*,G,I) =
  ( I 'in (  joins(*,*,RP(G))  (+)  joins(*,G)
       (+) pim_include(*,G)) )
  AND (RPF_interface(RP(G)) != I) AND
  (RPF_BACKUP_interface(RP(G)) != I)
AssertTrackingDesired(*,G,I) =
    CouldAssert(*,G,I)
    OR (local_receiver_include(*,G,I)==TRUE
        AND (I_am_DR(I) OR AssertWinner(*,G,I) == me))
    OR  ((RPF_interface(RP(G))  ==  I  OR
(RPF_BACKUP_interface(S) == I))
AND RPTJoinDesired(G)), where:
RPF_BACKUP_interface(S): a backup incoming interface to the multicast source; and
RPF_BACKUP_interface(RP(G)): a backup incoming interface to a convergent point.

---

With the method for forwarding data under protocol independent multicast dual join provided in this embodiment of the present invention, a related behavior method for a backup incoming interface in a PIM protocol at the time of assert is further complemented, a blank is filled, thereby facilitating implementation of compatibility in various manufacturers, and reducing a restriction of a network topology on the application of the PIM protocol.

Figure 4:
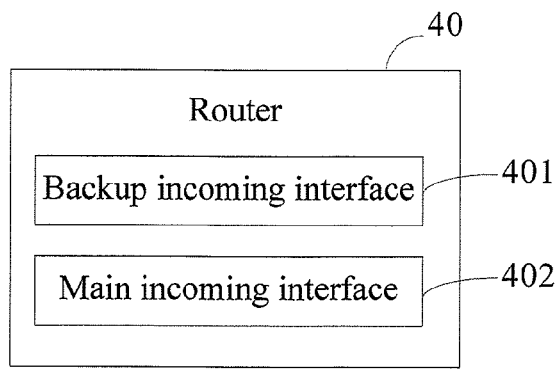
FIG. 4 is a schematic structural diagram of a router according to an embodiment of the present invention.

As shown in FIG. 4, a router 40, configured to forward data under protocol independent multicast dual join, is provided in an embodiment of the present invention, which includes a main incoming interface 402 and a backup incoming interface 401.

When the main incoming interface 402 is up, the router 40 forwards multicast data received from the backup incoming interface 401 to the main incoming interface 402 in a join state.

When the main incoming interface 402 is down, before selecting a new main incoming interface 402 and/or backup incoming interface 401, the router 40 forwards the multicast data received from the backup incoming interface 401 to all interfaces in a join state or to all other interfaces in a join state except the backup incoming interface 401.

With the router for forwarding data under protocol independent multicast dual join provided in this embodiment of the present invention, a data forwarding method of a backup incoming interface under protocol independent multicast dual join in a PIM protocol is complemented, a blank is filled, thereby facilitating implementation of compatibility in various manufacturers, and reducing a restriction of a network topology on the application of the PIM protocol.

Furthermore, when the main incoming interface 402 is up, the router 40 forwards multicast data received from the main incoming interface 402 to all interfaces in a join state except the main incoming interface 402 of the router 40.

Additionally, when assert takes place in a network segment where the backup incoming interface 401 is located, the backup incoming interface 401 of the router 40 does not participate in election for an assert winner, and sets an assert state to be an assert loser; and the backup incoming interface 401 is deleted from an outgoing interface list of the router 40.

The backup incoming interface 401 of the router 40 is further configured to record an elected assert winner.

In addition, when the assert winner recorded by the backup incoming interface 401 of the router 40 expires, the assert state of the backup incoming interface 401 is restored to be an initial state, and the backup incoming interface 401 is added to the outgoing interface list of the router 40.

With the router for forwarding data under protocol independent multicast dual join provided in this embodiment of the present invention, a related behavior method of a backup incoming interface in a PIM protocol at the time of assert is complemented, a blank is filled, thereby facilitating implementation of compatibility in various manufacturers, and reducing a restriction of a network topology on the application of the PIM protocol.

Figure 5:
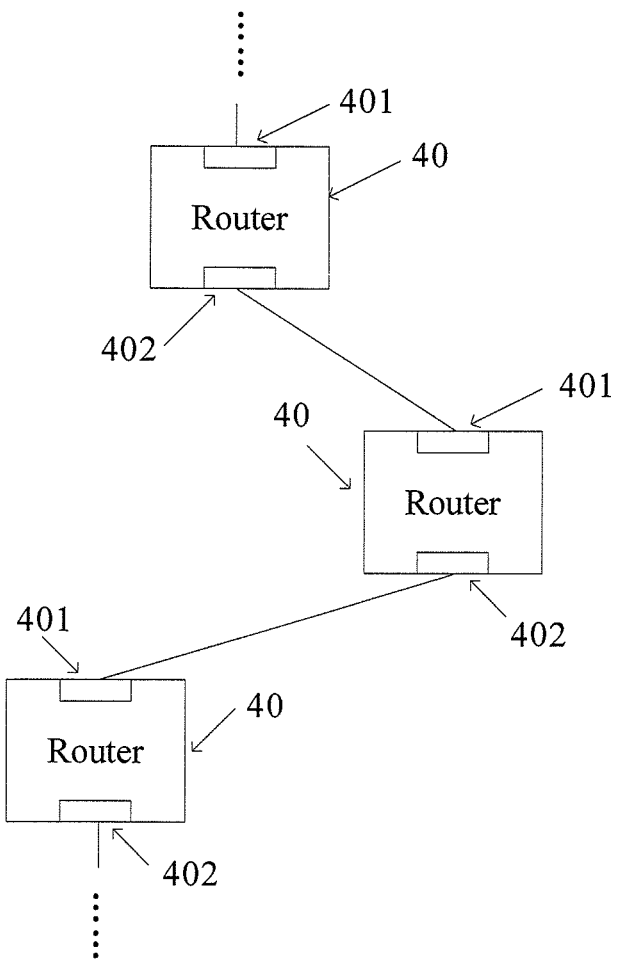
FIG. 5 is a third schematic structural diagram of a network used in an embodiment of the present invention.

As shown in FIG. 5, a network system, configured to forward data under protocol independent multicast dual join, is provided in an embodiment of the present invention and is formed by connecting multiple routers 40. Each router 40 includes a main incoming interface 402 and a backup incoming interface 401.

The backup incoming interface 401 is configured to, when the main incoming interface 402 is up, the router 40 forwards multicast data received from the backup incoming interface 401 to the main incoming interface 402 in a join state; and when the main incoming interface 402 is down, before selecting a new main incoming interface 402 and/or backup incoming interface 401, the router 40 forwards the multicast data received from the backup incoming interface 401 to all interfaces in a join state or to all other interfaces in a join state except the backup incoming interface 401.

The main incoming interface 402 is configured to, when the main incoming interface 402 is up, the router 40 forwards multicast data received from the main incoming interface 402 to all interfaces in a join state except the main incoming interface 402 of the router 40.

With the network system provided in this embodiment of the present invention, a data forwarding method of a backup incoming interface under protocol independent multicast dual join in a PIM protocol is complemented, a blank is filled, thereby facilitating implementation of compatibility in various manufacturers, and reducing a restriction of a network topology on the application of the PIM protocol.

Furthermore, the backup incoming interface 401 is further configured to, when assert takes place in a network segment where the backup incoming interface 401 is located, the backup incoming interface 401 does not participate in election for an assert winner, and sets an assert state to be assert loser, the backup incoming interface 401 is deleted from an outgoing interface list of the router 40, and an elected assert winner is recorded.

Based on the preceding, a related behavior method of a backup incoming interface in a PIM protocol at the time of assert is further complemented, a blank is filled, thereby facilitating implementation of compatibility in various manufacturers, and reducing a restriction of a network topology on the application of the PIM protocol.

Persons of ordinary skill in the art should understand that all or a part of the steps of the preceding method embodiments may be implemented by a program instructing relevant hardware. The program may be stored in a computer readable storage medium. When the program runs, the steps of the preceding method embodiments are performed. The storage medium may be any medium that is capable of storing program codes, such as an ROM, an RAM, a magnetic disk, or an optical disk.

The preceding descriptions are only specific embodiments of the present invention, but are not intended to limit the protection scope of the present invention. Any change or replacement that can be easily thought of by persons skilled in the art within the technical scope that is disclosed by the present invention shall fall within the protection scope of the present invention. Therefore, the protection scope of the present invention shall be subject to the protection scope of the claims.

What is claimed is:

1. A method for forwarding data under protocol independent multicast dual join, wherein under the protocol independent multicast dual join, a router comprises a main incoming interface and a backup incoming interface, and the method comprises:

when the main incoming interface is up, forwarding, by the router, multicast data, sent by a neighboring router, received from the backup incoming interface to the main incoming interface in a join state without forwarding the multicast data to an interface that is in a join state and is different from the main incoming interface and the backup incoming interface; and when the main incoming interface is down, before selecting a new main incoming interface and/or backup incoming interface, forwarding, by the router, the multicast data sent by the neighboring router back to the neighboring router via the backup incoming interface.

2. The method according to claim 1, further comprising:
when the main incoming interface is up, forwarding, by the router, multicast data received from the main incoming interface to all interfaces in a join state except the main incoming interface of the router.

3. The method according to claim 1, further comprising:
when assert takes place in a network segment where the backup incoming interface is located, not participating, by the backup incoming interface, in election for an assert winner, and setting an assert state to be an assert loser, wherein the backup incoming interface is deleted from an outgoing interface list of the router.

4. The method according to claim 3, further comprising:
recording, by the backup incoming interface, an elected assert winner.

5. The method according to claim 4, further comprising:
when the assert winner recorded by the backup incoming interface expires, restoring the assert state of the backup incoming interface to be an initial state, and adding the backup incoming interface to the outgoing interface list of the router.

6. The method according to claim 1, wherein the main incoming interface and the backup incoming interface enable a protocol independent multicast-sparse mode or a protocol independent multicast-source-specific multicast.

7. A router, configured to forward data under protocol independent multicast dual join, comprising a main incoming interface and a backup incoming interface, wherein
when the main incoming interface is up, the router forwards multicast data, sent by a neighboring router, received from the backup incoming interface to the main incoming interface in a join state without forwarding the multicast data to an interface that is in a join state and is different from the main incoming interface and the backup incoming interface; and
when the main incoming interface is down, before selecting a new main incoming interface and/or backup incoming interface, the router forwards the multicast data sent by the neighboring router back to the neighboring router via the backup incoming interface.

8. The router according to claim 7, wherein
when the main incoming interface is up, the router forwards multicast data received from the main incoming interface to all interfaces in a join state except the main incoming interface of the router.

9. The router according to claim 7, wherein
when assert takes place in a network segment where the backup incoming interface is located, the backup incoming interface of the router does not participate in election for an assert winner, and sets an assert state to be an assert loser, and the backup incoming interface is deleted from an outgoing interface list of the router.

10. The router according to claim 9, wherein
the backup incoming interface of the router is further configured to record an elected assert winner.

11. The router according to claim 10, wherein
when the assert winner recorded by the backup incoming interface of the router expires, the assert state of the backup incoming interface is restored to be an initial state, and the backup incoming interface is added to the outgoing interface list of the router.

12. A network system, comprising routers under protocol independent multicast dual join, wherein
a first router of the routers is configured to, when a main incoming interface of the first router is up, forward multicast data received from a backup incoming interface of the first router to the main incoming interface in a join state without forwarding the multicast data to an interface that is in a join state and is different from the main incoming interface and the backup incoming interface; and when the main incoming interface is down, before selecting a new main incoming interface and/or backup incoming interface, forward the multicast data sent by the neighboring router back to the neighboring router via the backup incoming interface.

13. The network system according to claim 12, wherein when assert takes place in a network segment where the backup incoming interface is located, the backup incoming interface does not participate in election for an assert winner, and sets an assert state to be an assert loser, the backup incoming interface is deleted from an outgoing interface list of the first router, and an elected assert winner is recorded.

14. The network system according to claim 12, wherein the first router is configured to forward, when the main incoming interface is up, multicast data received from the main incoming interface to all interfaces in a join state except the main incoming interface of the router.

* * * * *